Figure 1:
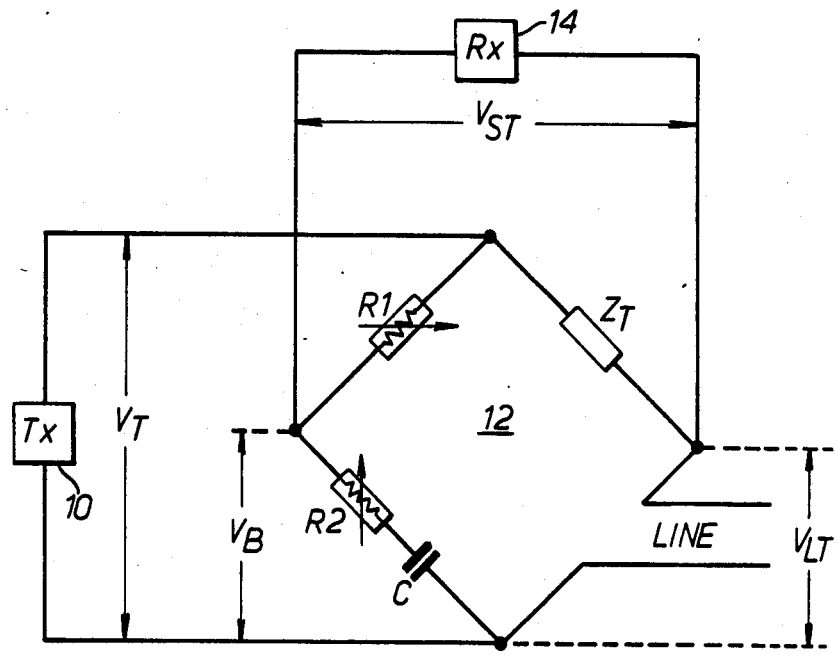

United States Patent [19]
Herman

[11] Patent Number: 4,677,666
[45] Date of Patent: Jun. 30, 1987

[54] ADAPTIVE LINE HYBRIDS

[75] Inventor: Ralph B. Herman, Maidenhead, England

[73] Assignee: Plessey Overseas Limited, Ilford, England

[21] Appl. No.: 632,832

[22] Filed: Jul. 20, 1984

[30] Foreign Application Priority Data

Jul. 22, 1983 [GB] United Kingdom ............... 8319786

[51] Int. Cl.$^4$ ............................................. H04M 1/58
[52] U.S. Cl. .................................. 379/392; 324/99 R
[58] Field of Search ............ 179/170 NC, 81 A, 81 B, 179/81 R, 16 F; 379/391, 392; 324/98, 99 R

[56] References Cited

U.S. PATENT DOCUMENTS

| 3,479,468 | 11/1969 | Kretzmer | 179/81 A |
| 3,748,399 | 7/1973 | Matsuda et al. | 179/81 A |
| 4,081,622 | 3/1978 | Clark et al. | 179/81 B |
| 4,146,753 | 3/1979 | D'Arrigo et al. | 179/81 A |

FOREIGN PATENT DOCUMENTS 2004166 3/1979 United Kingdom ........ 179/170 NC

OTHER PUBLICATIONS

Cooper, W. C., *Electronic Instrumentation and Measurement Techniques*, Prentice-Hall, New Jersey, 1978, pp. 178–197.
"Telephone Sets without Inductance Coils", Solelovaci Tech., vol. 25, No. 5, p. 191.
"An Adaptive Electronic Hybrid Transformer," Stanley A. White, IEEE Transactions on Communications, pp. 1184–1188, Dec. 1972.
"Digital Full Duplex Operation on Two-Wire Lines", Dietze et al., Electrical Communication, vol. 53, No. 2, pp. 161–164, 1978.

*Primary Examiner*—Gene Z. Rubinson
*Assistant Examiner*—R. Vaas
*Attorney, Agent, or Firm*—Fleit, Jacobson, Cohn & Price

[57] ABSTRACT

An adaptive line hybrid for digital telecommunications including a bridge circuit for connection to the telecommunication line the bridge circuit having automatically adjustable components in two arms of the bridge to compensate for variations in the characteristics of the telecommunications line.

4 Claims, 5 Drawing Figures

ADAPTIVE LINE HYBRIDS

The present invention relates to adaptive line hybrids and more particularly to adaptive line hybrids for use in digital telecommunication switching systems.

In modern telecommunications systems an analog to digital conversion is now possible in the subscriber apparatus and if full duplex transmission of signals is required on the existing 2 wire lines then it is necessary to separate the transmitted and received signals.

One method for separating digital signals is by use of a hybrid network. A problem with this method arises when a high decoupling attenuation in the relevant frequency range is required between the 4 wire connections to allow a maximum amount of line loss.

This is because the required balancing impedance depends on the line input impedance and this varies considerably with the type of line and the line length. In addition, it varies with frequency for a given line and it may also vary with time, e.g. due to changes in temperature or dampness of the cable.

In a known system as described in IEEE Transactions on Communications, December 1982—"An Adaptive Electronic Hybrid Transformer", a self balancing electronic circuit with two electrically variable resistors is used to reduce the effects of line variation. This circuit is based on a line impedance model corresponding to a single capacitor in parallel with a single resistor. However, this was for voice band transmission at 4.8 kb/s and the model does not give a good approximation to the line impedance over a broad band of frequencies corresponding to the spectrum of a digital signal transmitted at baseband, or at a higher bit rates which are now required. In addition, the circuit is more complicated than that of the present invention.

In a second known system, as described in Electrical Communication Volume 53 number 2 1978—"Digital Full Duplex operation on Two-wire lines", the hybrid consists of a bridge circuit in which the balancing arm comprises an automatically adjustable resistor in parallel with a fixed capacitor, both being in series with a fixed resistor. While this configuration potentially provides better compensation for line impedance variation with frequency than the first known system, it has the disadvantage that there is only one adjustable component. It can therefore provide only limited compensation for variable line characteristics. In addition the control circuit is based on signal amplitude only, disregarding phase, and therefore does not necessarily set the adjustable resistor to its optimum value.

It is an object of the present invention to provide an improved adaptive line hybrid. Accordingly the present invention provides an adaptive line hybrid circuit comprising a bridge circuit in which a 2 wire telecommunications line is connected in a first arm of the bridge, in which a receiver is connected across two opposite corners of the bridge and a transmitter across the other two opposite corners of the bridge and in which in a second and a third arm of the bridge there are provided automatically adjustable components to enable the bridge to compensate for variations in the telecommunications line.

Compensation is automatically achieved by using a control circuit with electrical outputs which automatically adjusts the adjustable components in the bridge. The design of the control circuit and the choice of the fixed components in the bridge are such that the bridge is automatically balanced at a frequency equal or close to the spectral peak of the transmitted signal - where accurate balance is most important while remaining nearly in balance over a broad band of frequencies around the spectral peak, so as include nearly all the power in the transmitted signal.

In a preferred embodiment the adjustable components are resistors.

In an improved embodiment the components in the second arm of the bridge comprise an adjustable resistor in series with a parallel combination of a resistor and capacitor.

Figure 2:
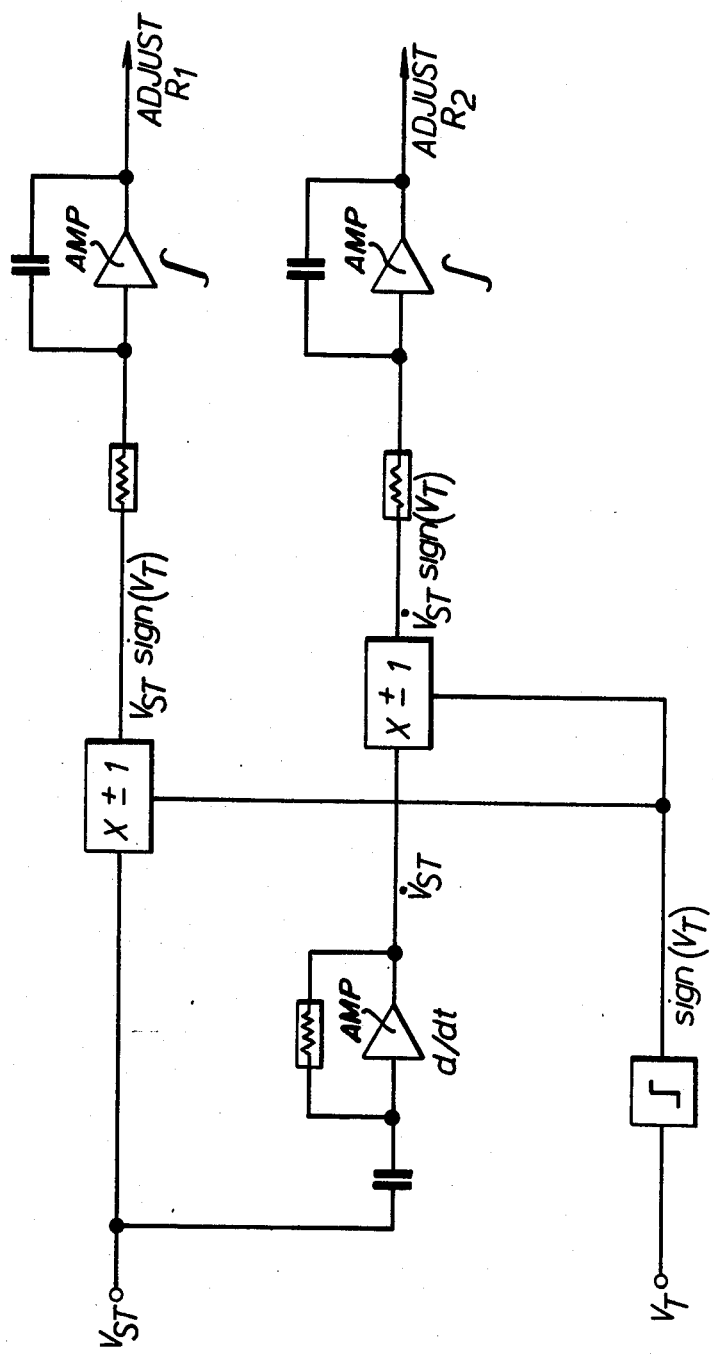
Figure 3:
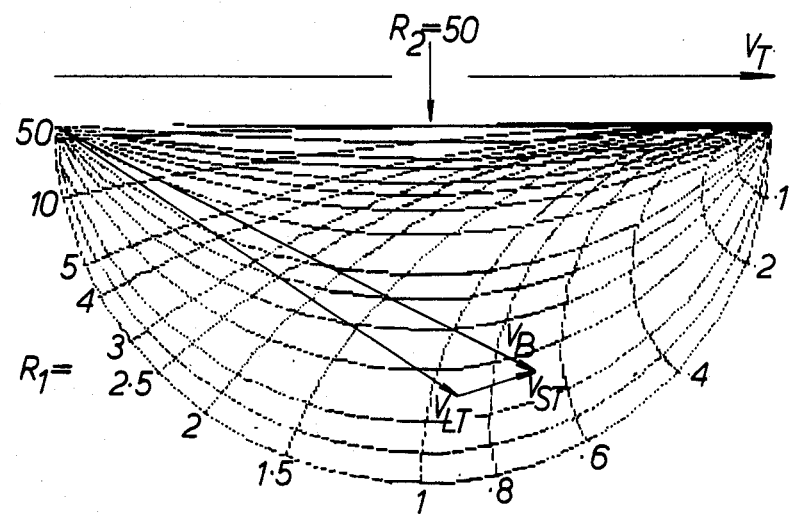
Figure 3:
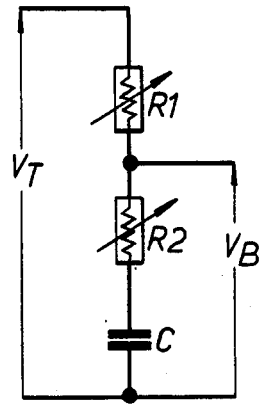
Figure 4:
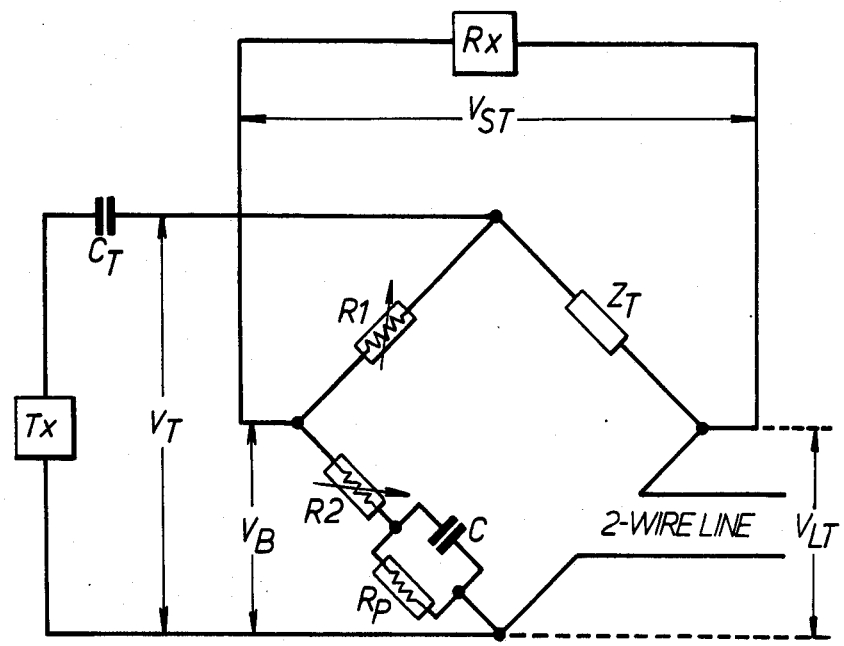
Figure 5:
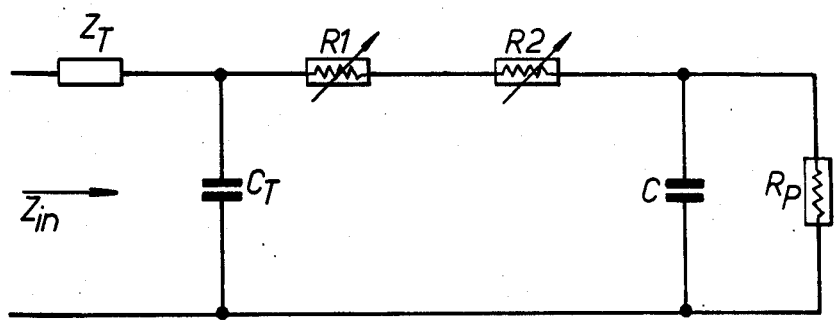

Embodiments of the present invention will now be described with reference to the accompanying drawings in which:

FIG. 1 shows an adaptive line hybrid with variable resistors in two arms of the bridge according to the present invention, FIG. 2 show a possible control circuit for automatic balance of the line hybrid circuits of FIGS. 1 and 4, FIG. 3 shows the vector loci of line balancing voltage with varying bridge resistor values and error vector diagram, FIG. 4 shows an improved form of adaptive line hybrid according to the present invention and, FIG. 5 shows the terminating impedance presented to line by the bridge circuit of FIG. 4.

Referring now to FIG. 1 of the drawings a transmitter 10 is connected to opposite corners of a bridge circuit 12 and a receiver 14 is connected to the other corners. The bridge circuit comprises resistors $R_1$, $R_2$, capacitor C impedance $Z_T$ and the line impedance.

The voltage shown are as follows:
$V_T$ = Transmitter output
$V_{LT}$T = Voltage transmitted to line
$V_B$ = Line balancing voltage
$V_{ST} = V_B - V_{LT}$ = Transmitter sidetone voltage at receiver input. put.

The resistors $R_1$ and $R_2$ are adjustable to compensate for variations in line impedances and to minimise the transmitter side tone voltage at the receiver input. A suitable circuit for adjusting the resistors is shown in FIG. 2.

The automatic adjustment of the hybrid, is based on correlation between the transmitted signal $V_T$ with the in-phase and the quadrature components of the sidetone signal $V_{ST}$, in which a differentiator is used to derive the quadrature component of $V_{ST}$.

However, other forms of control circuit are also possible. For example an integrator might be used instead of a differentiator or the control voltages might be obtained by correlating $V_{ST}$ with the in-phase and quadrature components of $V_T$.

FIG. 3 shows sets of vector loci of the balancing voltage $V_B$ with resistor $R_1$ as variable and resistor $R_2$ as parameter; also for variable $R_2$ with $R_1$ as parameter. It is seen that either adjustment alters both the real and imaginary components of $V_B$ and hence also of the sidetone voltage $V_{ST}$. Nevertheless, increase of $R_1$ always increases the real component of $V_B$ while increase of $R_2$ always increases the imaginary component. Hence, when the control signals are derived as indicated in FIG. 3, it can be expected that the system will always converge towards balance.

In FIG. 1, if $Z_T$ is a resistor, then the balance condition becomes independent of frequency if the line impedance is equivalent to a fixed resistor in series with a fixed capacitor.

In practice the input impedance of a telephone line does not correspond exactly to a fixed resistance in series with a fixed capacitance (though this is valid as a first approximation, it does not accurately represent the input impedance of a telecommunications line over a wide band of frequencies). Hence the circuit of FIG. 1 can give an exact balance only at a single frequency, and some modification is desirable based on a better model of line impedance to improve the accuracy of balance over the range of frequencies contained in the spectrum of the transmitted signal.

To obtain a better match to the cable characteristic impedance over the frequency band, a resistor $R_p$ may be added in parallel with C, as shown in FIG. 4. The same control circuit could be used as before, i.e. as shown in FIG. 2, but as this provides only two controls of a particular kind, the resistor $R_p$, as well as the capacitor C, need to be selected as the best fixed compromise values to cover the range of cable impedance characteristics which might be encountered. (Other control techniques are possible which might deal with 3 or more adjustments but would probably result in a more complicated control unit). The additional coupling capacitor $C_T$ does not affect the balance condition directly, but modifies the terminating impedance presented to the cable by the bridge circuit so as to improve the match over the frequency band to the cable characteristic impedance. Assuming a similar bridge circuit at the far end of the cable, this makes the line input impedance at the near end less dependent on cable length. If the transmitter output impedance is assumed to be small and the receiver input impedance high, then the terminating impedance presented to the line by the bridge circuit will be as shown in FIG. 5. The four fixed components $Z_T$, $C_T$, C and $R_p$ should be selected as the best comprise values to meet the joint requirements of optimum bridge balance and optimum line terminating impedance over the frequency and over the range of cable types which might be encountered. In the context of line termination, the values of the variable resistances $R_1$ and $R_2$ are not arbitrary since when the hybrid adapts to the line they become functions of the line impedance and the other bridge circuit component values.

Further improvements can be obtained by adding a second suitably chosen fixed reactive component such as a capacitor connected in series in the second arm of the bridge circuit as shown dotted in FIG. 4. The circuit would then have four degrees of freedom with regard to the balance condition, two being adaptive adjustments to the particular line to which it is connected and the other two being design stage choices to provide the best compromise balance over the frequency band, for the range of cables to which it might be connected. With these degrees of freedom it ought to be possible, for example, to ensure an exact balance at the frequency of the spectral peak with any cable and, at the same time, an exact balance at a second specifiable frequency for any specified cable impedance characteristic. In the present context the second specified frequency might be the lowest significant frequency in the signal spectrum, i.e. 14.4 kHz at 32 kbit/s, where balancing might otherwise be most difficult. The specified cable characteristics might be that of a hypothetical cable having an impedance variation with frequency on the centre line of the total impedance spread for all the cables that are in use.

In a practical embodiment the fixed components are pre-selected for a hypothetical average cable and the variable components are automatically controlled so as to balance the bridge to the actual cable at 37 kHz. It is then estimated that, in the worst case, sidetone attenuation would be 24 dB for a spectral component at 14.4 kHz. For the complete sidetone signal, with proper spectral weighting, the discrimination is likely to be substantially better than 24 dB and for most cables it should be very much better.

It will be appreciated by one skilled in the art that variations and modifications can be made to the invention, for example, in FIGS. 1 and 4 the line is shown directly connected to the bridge. In practice transformer coupling may be preferred for a number of reasons, e.g. to provide DC isolation between the line and the line termination equipment, to provide a DC path for power feed purposes or to balance the line signal voltages with respect to ground. If such a transformer is included it should have a low leakage inductance and high mutual inductance and low winding capacitance to minimize the effect on bridge balance. Additional reactances may be added in other arms of the bridge to compensate for transformer imperfections or other circuit parasitic reactances.

I claim:

1. An adaptive line hybrid circuit comprising a bridge circuit in which a two-wire telecommunications line is connected in a first arm linking a first corner and a fourth corner of the bridge, in which a receiver is connected across said first corner and a third corner of the bridge and a transmitter is connected across a second corner and said fourth corner of the bridge and in which in each of a second arm of the bridge linking said second corner and said third corner and a third arm of the bridge linking said third corner and said fourth corner there is provided at least one automatically adjustable passive component, each of said automatically adjustable components being adjusted to compensate for variations in the telecommunications line; and a control circuit means for automatically and independently adjusting both said adjustable passive components based upon a transmitted signal and a transmitter side tone signal and a correlation between the inphase and quadrature components of one of those signals and the other of those signals.

2. An adaptive line hybrid circuit as claimed in claim 1 in which the adjustable components are resistors.

3. An adaptive line hybrid circuit as claimed in claim 1 in which the adjustable component in the second arm of the bridge is an adjustable resistor which is in series with a parallel combination of a resistor and a capacitor.

4. An adaptive line hybrid circuit as claimed in claim 3 in which the second arm of the bridge further comprise a capacitor connected in series with said adjustable resistor and said parallel combination.

* * * * *